D. HINKLE.
Clover Harvester.
No. 32,692.
Patented July 2, 1861.
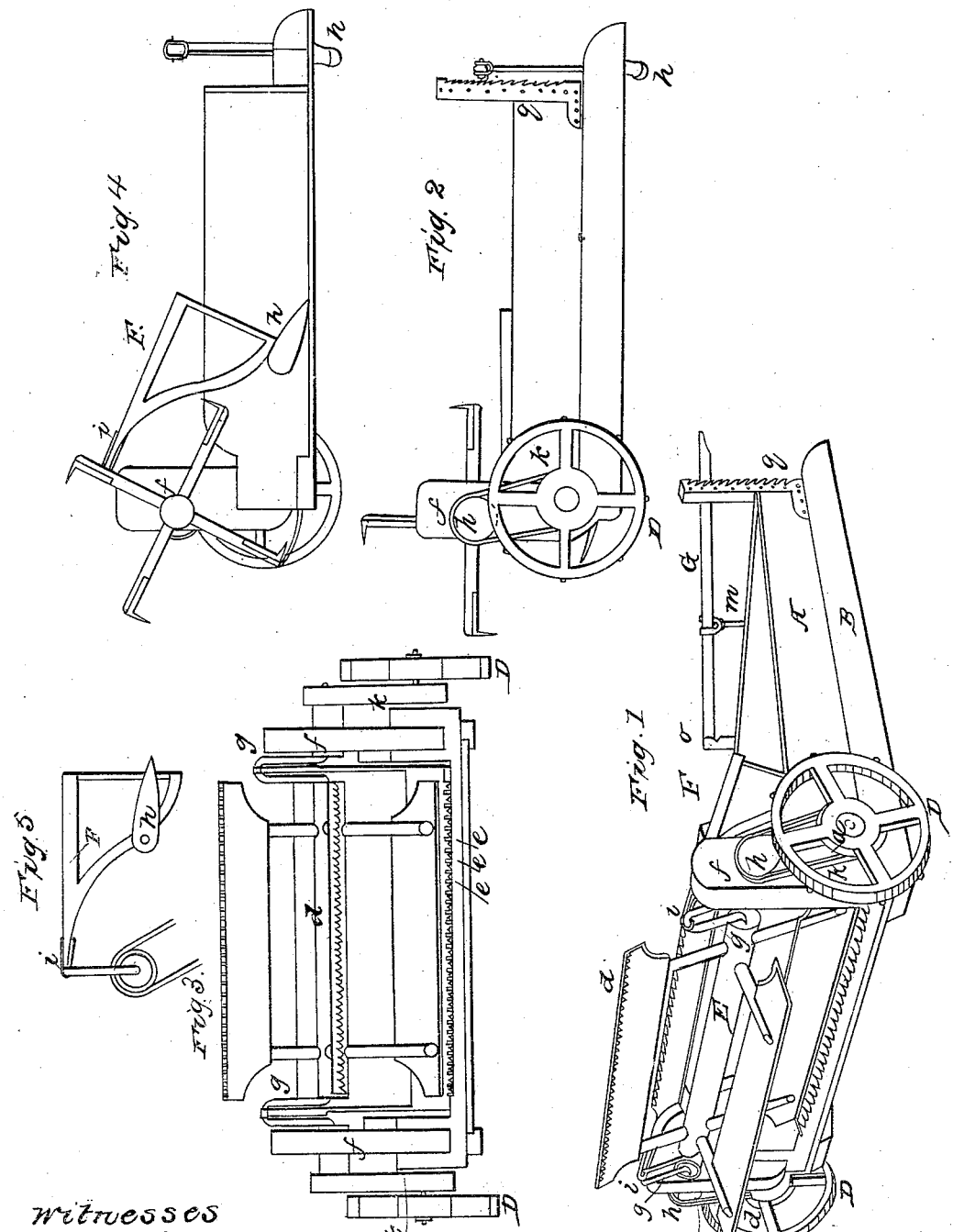
Witnesses
Henry Lehman
S. P. Klinger
Inventor
David Hinkle

UNITED STATES PATENT OFFICE.

DAVID HINKLE, OF NEW PITTSBURG, OHIO.

IMPROVEMENT IN CLOVER-HARVESTERS.

Specification forming part of Letters Patent No. 32,692, dated July 2, 1861.

*To all whom it may concern:*

Be it known that I, DAVID HINKLE, of New Pittsburg, in the county of Wayne and State of Ohio, have invented certain new and useful Improvements in Clover-Stripping Machines; and I do hereby declare that the following is a full and exact description of the same, reference being had to the annexed drawings, and to the letters of reference marked thereon, in which—

Figure 1 is a perspective, Fig. 2 a side elevation, Fig. 3 a front view, Fig. 4 a longitudinal section, and Fig. 5 a section, of the packing attachment.

The nature of my invention consists in arranging the packing attachment in such a way that it will be operated by and work in conjunction with the reel; also, in the arrangement therewith of certain other devices, the peculiarities of which will be hereinafter fully set forth.

To enable others skilled in the art to make and use my invention, I will now describe its construction and operation.

A represents the box, secured to frame B. Said box should be open in front, as partially seen in Fig. 1. D D are the driving-wheels. Between each of these wheels and the box A, and on the same axle, are secured wheels $a$ $a$, the object of which will be more fully seen hereinafter. E represents a reel the paddles or wings of which should be of sufficient width to throw the clover back into the box when they revolve. On one (or more, if necessary) I secure the serrated knife $d$, as seen in Figs. 1 and 3, for the purpose of nipping off the heads of the clover as they are caught between the teeth $e$ $e$ $e$ $e$, which are secured to the bottom of the front part of box A, as shown in Fig. 1.

$g$ is a crank-shaft, upon which the reel E is revolved. Said shaft extends through uprights $f$ $f$, and its ends provided with pulleys $h$ $h$.

$k$ $k$ represent bands which encircle wheels $a$ $a$ and pulleys $h$ $h$, and thus motion is communicated to the reel. F represents a packing attachment, constructed as shown in Fig. 5. Said attachment is connected to the cranks on shaft $g$ by means of loops $i$ $i$.

$n$ $n$ are two guides secured to each side of box A, for the purpose of directing the motion of the packing attachment.

G is a lever pivoted to upright $o$.

$m$ is a vertical rod, at the bottom of which is secured the caster $p$. Said rod $m$ is pivoted to the lever G, as seen in Fig. 1. Thus by means of this lever the back part of the machine can be elevated or lowered, which, of course, will throw the front part up or down, and thereby be accommodated to the length of the clover.

$q$ is a serrated plate to retain the lever at any desired elevation.

The operation is obvious. As the reel revolves, the packing attachment catches the clover which has been gathered and packs it back in the box, from whence it is taken.

Having thus fully described my invention, what I claim, and desire to secure by Letters Patent, is—

1. The employment of the packing attachment F, arranged and operated in conjunction with reel B, substantially as and for the purpose set forth.

2. The arrangement of the packing attachment F, in combination with guides $d$ $d$, reel B, knife $a$, and lever G, when all shall be constructed and operated in the manner and for the purpose specified.

DAVID HINKLE.

Attest:
HENRY LEHMAN,
JOHN HEICHHOLD.